(12) United States Patent
Quehenberger et al.

(10) Patent No.: US 9,272,619 B2
(45) Date of Patent: Mar. 1, 2016

(54) POWERTRAIN FOR A MOTOR VEHICLE

(71) Applicants: Johannes Quehenberger, Saalbach (AT); Simon Kaimer, Fernitz (AT); Martin Parigger, Eggersdorf (AT)

(72) Inventors: Johannes Quehenberger, Saalbach (AT); Simon Kaimer, Fernitz (AT); Martin Parigger, Eggersdorf (AT)

(73) Assignee: Magna Powertrain AG & Co KG, Lannach (AT)

( * ) Notice: Subject to any disclaimer, the term of this patent is extended or adjusted under 35 U.S.C. 154(b) by 87 days.

(21) Appl. No.: 13/905,667

(22) Filed: May 30, 2013

(65) Prior Publication Data

US 2013/0260959 A1    Oct. 3, 2013

Related U.S. Application Data

(63) Continuation of application No. 12/577,229, filed on Oct. 12, 2009, now abandoned.

(30) Foreign Application Priority Data

Oct. 13, 2008  (DE) .......................... 10 2008 051 461
Jan. 21, 2009  (DE) .......................... 10 2009 005 378

(51) Int. Cl.
*G06F 7/00*     (2006.01)
*G06F 17/00*    (2006.01)
*G06F 19/00*    (2011.01)
*B60K 23/08*    (2006.01)
*B60K 17/35*    (2006.01)
*F16D 48/06*    (2006.01)

(52) U.S. Cl.
CPC ................. *B60K 23/08* (2013.01); *B60K 17/35* (2013.01); *B60K 17/3515* (2013.01); *F16D 48/06* (2013.01); *F16D 2500/10431* (2013.01); *F16D 2500/30428* (2013.01); *F16D 2500/3118* (2013.01); *F16D 2500/5075* (2013.01); *F16D 2500/70605* (2013.01); *Y10T 477/613* (2015.01)

(58) Field of Classification Search
CPC ...... B60K 23/0808; B60K 6/52; B60K 23/08; B60K 17/35; Y10T 477/613
USPC ................... 701/51, 67, 69; 180/197; 464/37
See application file for complete search history.

(56) References Cited

U.S. PATENT DOCUMENTS 5,762,578 A  *  6/1998  Forsyth ......................... 475/198
5,813,490 A  *  9/1998  Takasaki ............ B60K 23/0808
                                                        180/249

(Continued)

FOREIGN PATENT DOCUMENTS

JP          61282123 A    12/1986
JP         2007223588 A    9/2007

*Primary Examiner* — Tuan C. To
*Assistant Examiner* — Isaac Smith
(74) *Attorney, Agent, or Firm* — Dickinson Wright PLLC

(57) ABSTRACT

The invention relates to a powertrain for a motor vehicle having a permanently driven primary axle, comprising: a drive unit for the generation of a drive torque; a first clutch for the transfer of a variable portion of the drive torque to a secondary axle of the motor vehicle; a second clutch for the deactuation of a torque transfer section of the powertrain arranged between the first clutch and the second clutch when the first clutch is opened; and a control unit for the automatic control of the first clutch, with the control unit being connected to at least one sensor for the detection of a wheel slip at the primary axle; with the control unit being made, starting from a deactuated state of the torque transfer section, to close the second clutch in dependence on a detected wheel slip at the primary axle.

18 Claims, 12 Drawing Sheets

(56) References Cited

U.S. PATENT DOCUMENTS

| | | | |
|---|---|---|---|
| 6,079,535 A * | 6/2000 | Mueller | B60K 17/34 180/247 |
| 6,286,379 B1 * | 9/2001 | Yester | F16H 63/304 475/204 |
| 2004/0034461 A1 * | 2/2004 | Kadota | B60K 6/44 701/67 |

* cited by examiner

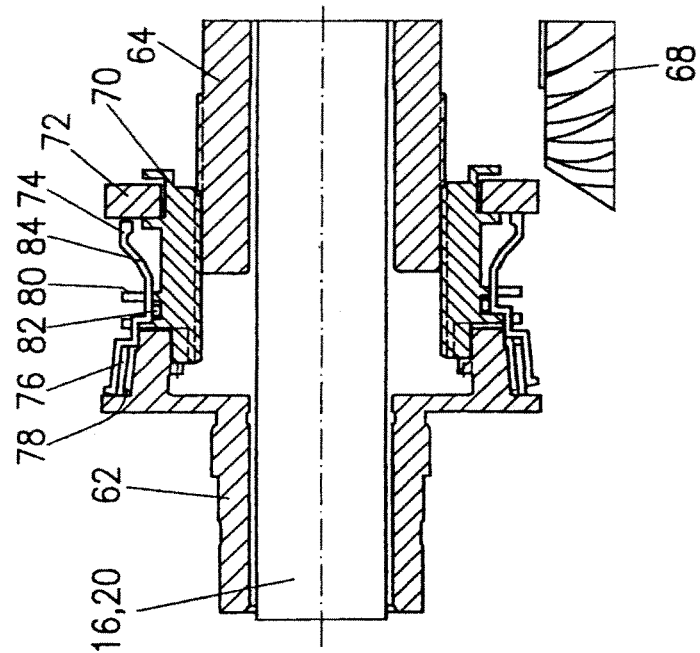
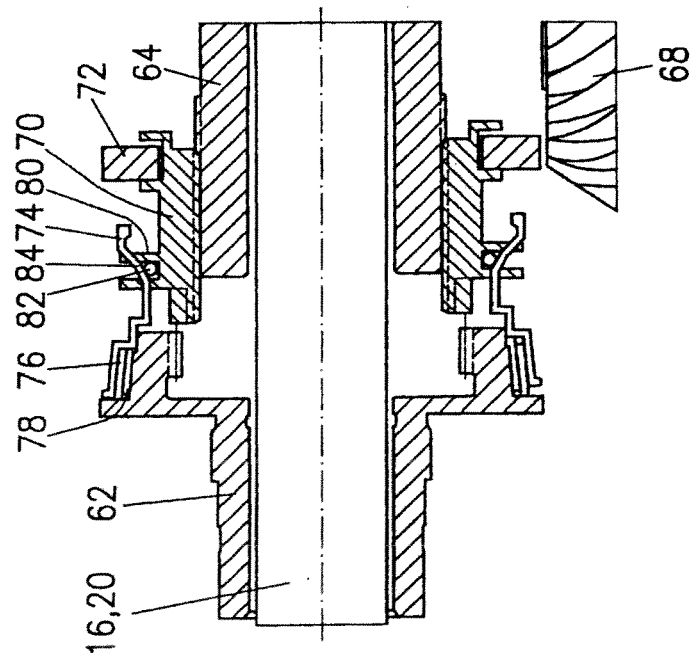

POWERTRAIN FOR A MOTOR VEHICLE

CROSS-REFERENCE TO RELATED APPLICATIONS

This application is a continuation of U.S. patent application Ser. No. 12/577,229 filed Oct. 12, 2009 which claims priority to German Patent Application Nos. 102008051461.6 filed Oct. 13, 2008, and 102009005378.6 filed Jan. 21, 2009. The entire disclosures of each of the above applications are incorporated herein by reference.

FIELD

The invention relates to a powertrain for a motor vehicle having a permanently driven primary axle which includes a drive unit for the generation of a drive torque, a first clutch for the transfer of a variable portion of the drive torque to a secondary axle of the motor vehicle, a second clutch for the deactuation of a torque transfer section of the powertrain arranged between the first clutch and the second clutch when the first clutch is opened, and a control unit for the automatic control of the first clutch, with the control unit being connected to at least one sensor for the detection of a wheel slip at the primary axis.

BACKGROUND

This section provides background information related to the present disclosure which is not necessarily prior art.

A powertrain of this type is known, for example, from U.S. Pat. No. 5,411,110. It provides the operator of the motor vehicle with the option of choosing between a permanent two-wheel drive mode in which the drive of the vehicle takes place only via the primary axle and an automatic four-wheel drive mode, a so-called "on-demand" drive mode, in which under specific driving conditions, for example when the wheels which are driven by the primary axle spin, a specific portion of the drive torque is automatically transferred to the wheels of the secondary axle to provide an intermittent four-wheel drive.

To prevent parts of the powertrain which are not required in permanent two-wheel drive, in particular unnecessary masses, from being moved, a deactuation of the torque transfer section leading to the secondary axle is provided in the powertrain of U.S. Pat. No. 5,411,110 in that the second clutch is disengaged.

As soon as the operator of the motor vehicle selects the automatic four-wheel drive mode, the second clutch is closed. The torque transfer section is now rotationally fixedly connected to the secondary axle so that, on demand, drive torque can be transferred to the secondary axle as fast as possible. In the automatic four-wheel drive mode, the torque transfer section therefore constantly turns along during the travel since it is driven by the drive unit with a closed first clutch and by the secondary axle with an opened first clutch. This is ultimately at the cost of fuel economy.

SUMMARY

This section provides a general summary of the disclosure, and is not a comprehensive disclosure of its full scope or all of its features.

It is the underlying object of the invention to provide a powertrain which allows a fast demand-dependent transfer of drive torque to the secondary axle with improved fuel efficiency.

The object is satisfied by a powertrain having the features of, in particular, a control unit that is made, starting from a deactuated state of the torque transfer section, to close the second clutch in dependence on a detected wheel slip of a primary axle.

It is therefore the underlying general idea of the invention also generally to hold the torque transfer section in a deactuated state in an automatic four-wheel drive mode and only to couple it rotationally fixedly with the secondary axle by closing the second clutch when a wheel slip is detected at the primary axle, i.e. when the averaged speed of the wheels of the primary axle exceeds the averaged speed of the wheels of the secondary axle by a predetermined amount (optionally dependent on the steering angle).

Not only the first clutch, but also the second clutch is thus controlled in dependence on the detection of a wheel slip at the primary axle in the automatic four-wheel drive mode. It can hereby be ensured that the torque transfer section is already rotationally fixedly connected e.g. to the secondary axle when the first clutch starts to transfer the desired portion of the drive torque to the secondary axle.

In accordance with the invention, the torque transfer section is also mainly deactuated in the automatic four-wheel drive mode under normal driving conditions, whereby the vehicle travels in a two-wheel mode (2WD) over a longer time period or over longer distances than with conventional systems and better fuel economy is thus achieved. At the same time, it can be ensured by the closing of the second clutch in dependence on the detection of a wheel slip at the primary axle that the torque transfer section is rotationally fixedly connected to the secondary axle within a very short time, for example within a few 100 milliseconds, e.g. within 200 to 300 milliseconds, so that the first clutch can transfer a desired portion of drive torque to the secondary axle almost without delay on a demand determined by the control unit. In this manner, in accordance with the invention, not only increased fuel efficiency, but also increased driving safety and improved driving performance are achieved.

Advantageous embodiments of the invention can be seen from the description and from the drawing.

In accordance with an embodiment, the first clutch is a wet or a dry multi-disk clutch. In this respect, the first clutch can be part of a transfer case or of a torque diversion device (power take-off unit) which is supported behind a variable speed gearbox of the motor vehicle, for example. The second clutch is preferably a dog clutch which can be actuable electromechanically or hydraulically.

To ensure an engagement of the second clutch which is as soft as possible, i.e. not noticeable for a vehicle occupant, and simultaneously easy on material, a synchronization device is preferably provided which is in particular controlled by the control unit and by which the deactuated torque transfer section can be accelerated before an engagement of the second clutch; for example, can be accelerated at least approximately to the speed of the secondary axle.

In accordance with a particularly advantageous embodiment, the synchronization device is formed by the first clutch. In this manner, the first clutch satisfies a dual function in that it not only serves for the synchronization of the torque transfer section with the secondary axle, but also for the subsequent transfer of drive torque from the drive unit to the secondary axle. An additional synchronization device is thus generally not necessary, whereby a more compact and lighter construction of the powertrain is achieved, which ultimately benefits an even better fuel economy.

In accordance with a further embodiment, the synchronization device can, however, also include a synchronization apparatus which is independent of the first clutch and which is provided, for example, additionally to the first clutch. Such a synchronization apparatus can, for example, be integrated into the second clutch, i.e. into the dog clutch, so that the dog clutch so-to-say itself acts as the synchronization device. In this case, the first and second clutches are both controlled so that they contribute to a synchronization together.

An embodiment is moreover conceivable in which the acceleration of the deactuated torque transfer section takes place at least approximately exclusively by the synchronization apparatus independent of the first clutch, for example by the second clutch, i.e. the dog clutch. This variant proves to be particularly advantageous e.g. in a powertrain in which, for space reasons, the first clutch is arranged at the secondary axle and the second clutch is arranged at the primary axle. In this case, the deactuated torque transfer section is therefore accelerated by the synchronization apparatus integrated e.g. into the second dog clutch approximately to the speed of the primary axle. The second clutch can for this purpose have a synchronization apparatus without a blocking device so that it can also be engaged when there is no speed identity between the clutch parts to be brought into engagement.

Correspondingly, the control unit in this variant can be made, starting from a deactuated state of the torque transfer section, first to close the second clutch in dependence on a detected wheel slip of a primary axle and then to close the first clutch.

The control unit is generally advantageously made to accelerate the torque transfer section so that a longitudinal acceleration of the vehicle resulting from the acceleration of the torque transfer section is at least hardly noticeable for a vehicle occupant and does not exceed an acceleration limit value which does not exceed or hardly exceeds the perception threshold, but is as close to it as possible.

The acceleration limit value can be preset in dependence on environmental factors such as the vehicle speed, the vehicle acceleration, the noise in a vehicle speed signal and/or in a vehicle acceleration signal, the road conditions, a wheel slip detected at the primary axle, pedal positions, steering wheel position and/or further values. It is possible in this manner to bring the torque transfer section to the speed of the secondary axle and to connect it rotationally fixedly thereto while taking account of external circumstances within a very short time and essentially not noticeable for a vehicle occupant.

The control unit can furthermore be made to accelerate the torque transfer section in accordance with a predetermined speed gradient, in particular a speed gradient which is constant and/or is taken from a look-up table.

To monitor the acceleration of the torque transfer section from the deactuated state into the state synchronized with the secondary axle, a speed of rotation sensor is preferably provided and connected to the control unit for the detection of the speed of the torque transfer section.

To be able to determine when the torque transfer section and the secondary axle are rotating at at least approximately the same speed, a speed of rotation sensor for the detection of the speed of the secondary axle can additionally be connected to the control unit for a simple engagement of the second clutch which is easy on the material. Correspondingly, the control unit is preferably made to engage the second clutch in dependence on the speed of the torque transfer section detected by the speed of rotation sensor.

The control unit can in particular be made to engage the second clutch in dependence on the difference between the speed of the torque transfer section and the speed of the secondary axle. Ideally, the engagement of the second clutch takes place when the speed difference is equal to zero. In practice, an engagement of the second clutch can, however, also be possible at small speed differences.

Alternatively to an actuation of the second clutch by the control unit, a blocking synchronization device can be provided which only permits an engagement of the second clutch when the difference between the speed of the torque transfer section and the speed of the secondary axle is in a preset range. In this case, the blocking synchronization device ensures that the second clutch can only engage when the torque transfer section has at least approximately reached the speed of the secondary axle.

To facilitate the engagement of the second clutch, the control unit can be made to reduce the drive torque of the drive unit during the engagement of the second clutch. This is preferably a brief torque reduction not noticeable for a vehicle occupant. Alternatively or additionally, the torque of the clutch, which acts as the synchronization device at the primary axle side of the deactuated torque transfer section, can be reduced to extend the time window in which there is speed similarity between the torque transfer section and the axle which should be connected to the torque transfer section by the second clutch, Furthermore, the control unit can be made to increase the drive torque of the drive unit during the synchronization of the torque transfer section, in particular by approximately the amount which is required for the synchronization of the torque transfer section. In this manner, a fall in the drive torque at the primary axle caused by the synchronization is compensated and it is prevented that the vehicle loses speed due to the synchronization of the torque transfer section or that a vehicle occupant notices the synchronization procedure.

The torque required for the synchronization of the torque transfer section reduces a wheel slip present at the wheels of the primary axle. The synchronization of the torque transfer section can thus contribute to the traction control in that the torque used for the synchronization is selected so that the wheel slip is kept at a constant low level.

A further subject of the invention is moreover a method by which the aforesaid advantages can be correspondingly achieved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 10A-10C are cross-sectional views of a dog clutch with a synchronization apparatus used in the powertrain of FIG. 9:

Figure 9:
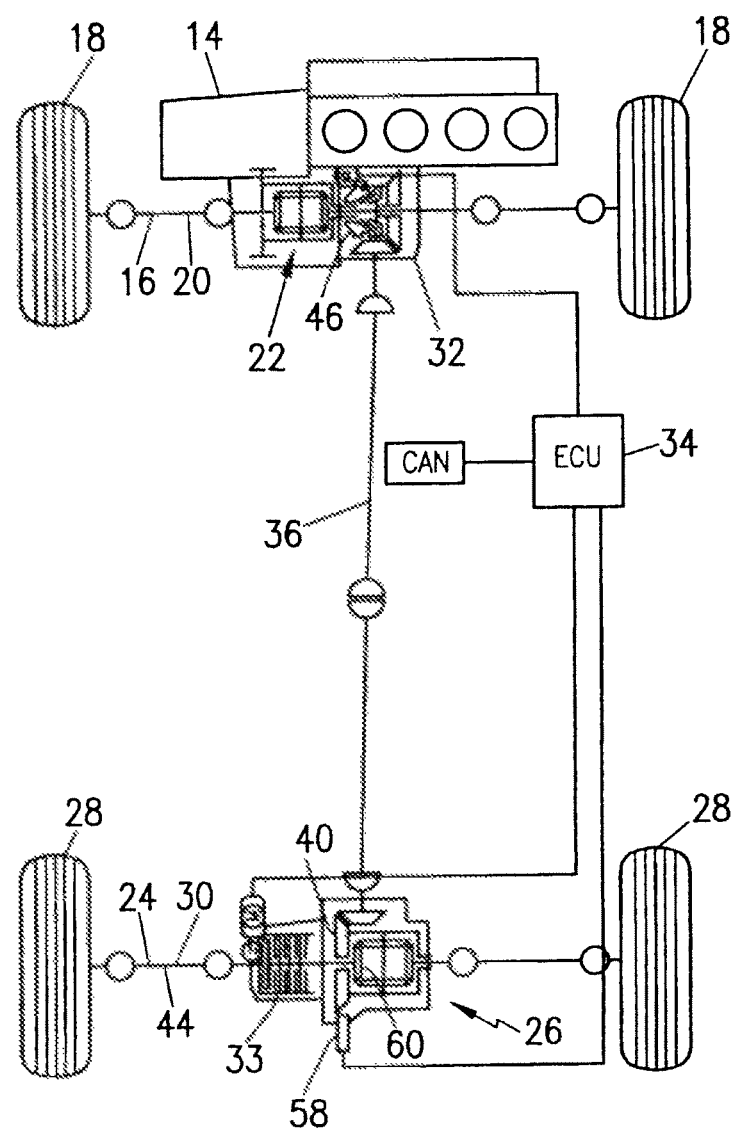
FIG. 9 is a schematic representation of a seventh embodiment of a powertrain in accordance with the invention.
Figure 11:
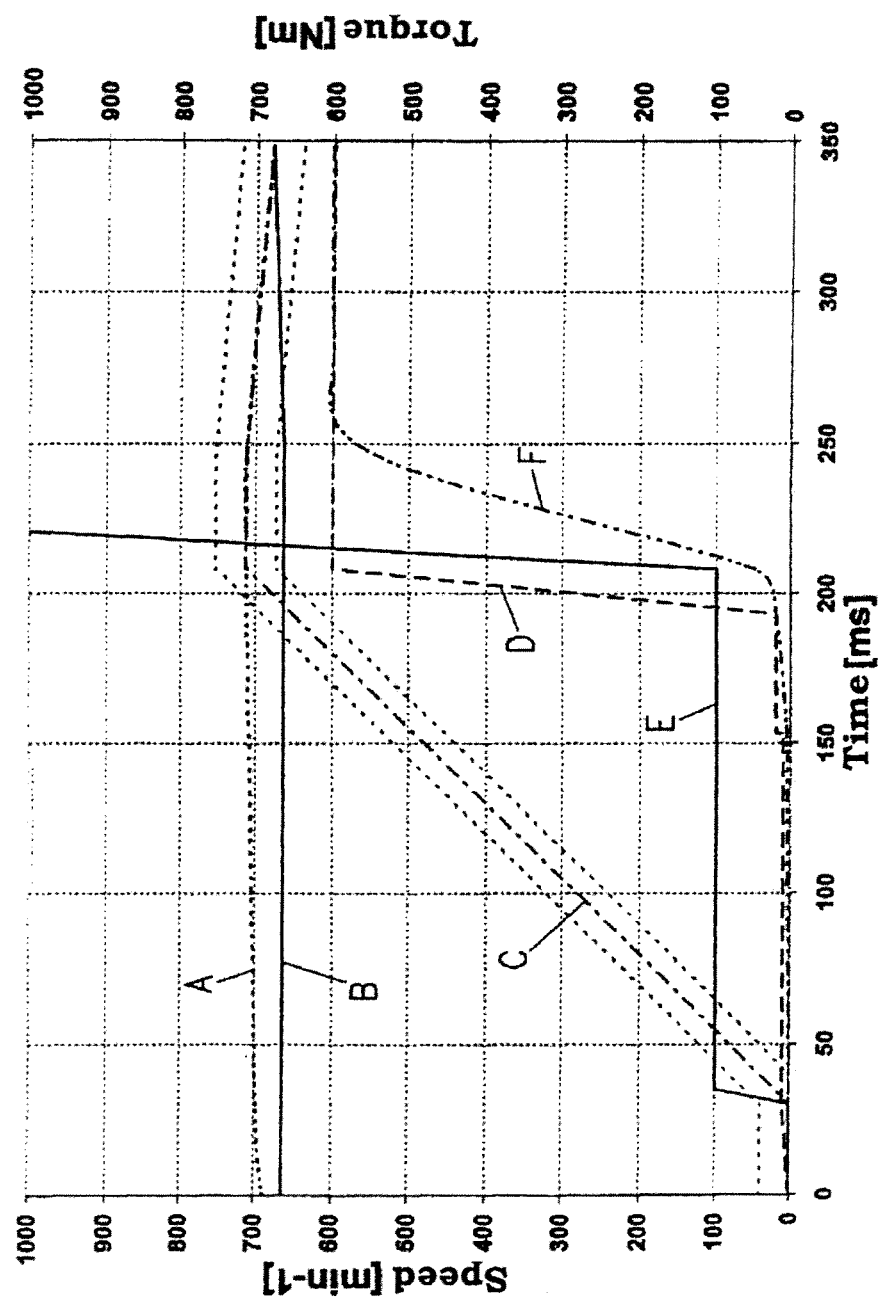
Figure 12:
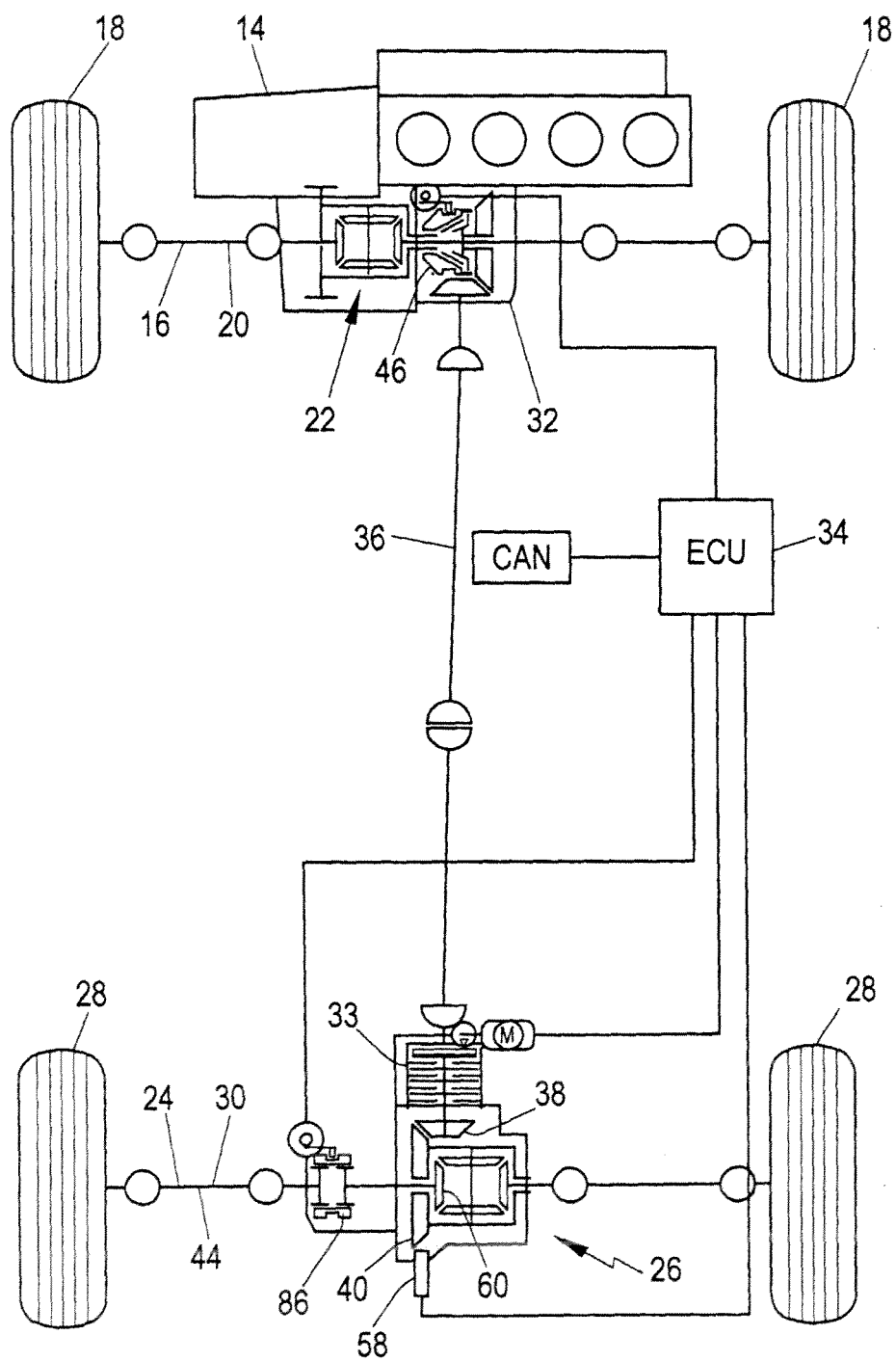

FIG. 11 is a graphic in which the speeds of a primary axle, of a secondary axle, of a torque transfer section leading from the primary axle to the secondary axle, and the drive torque transferred to the secondary axle during the engagement of the secondary axle from a deactuated state of the torque transfer section in the powertrain from FIG. 9 are shown; and FIG. 12 is a schematic representation of an eighth embodiment of a powertrain in accordance with the invention.

Corresponding reference numerals indicate corresponding parts throughout the several views of the drawings.

DETAILED DESCRIPTION

Example embodiments will now be described more fully with reference to the accompanying drawings.

Figure 1:
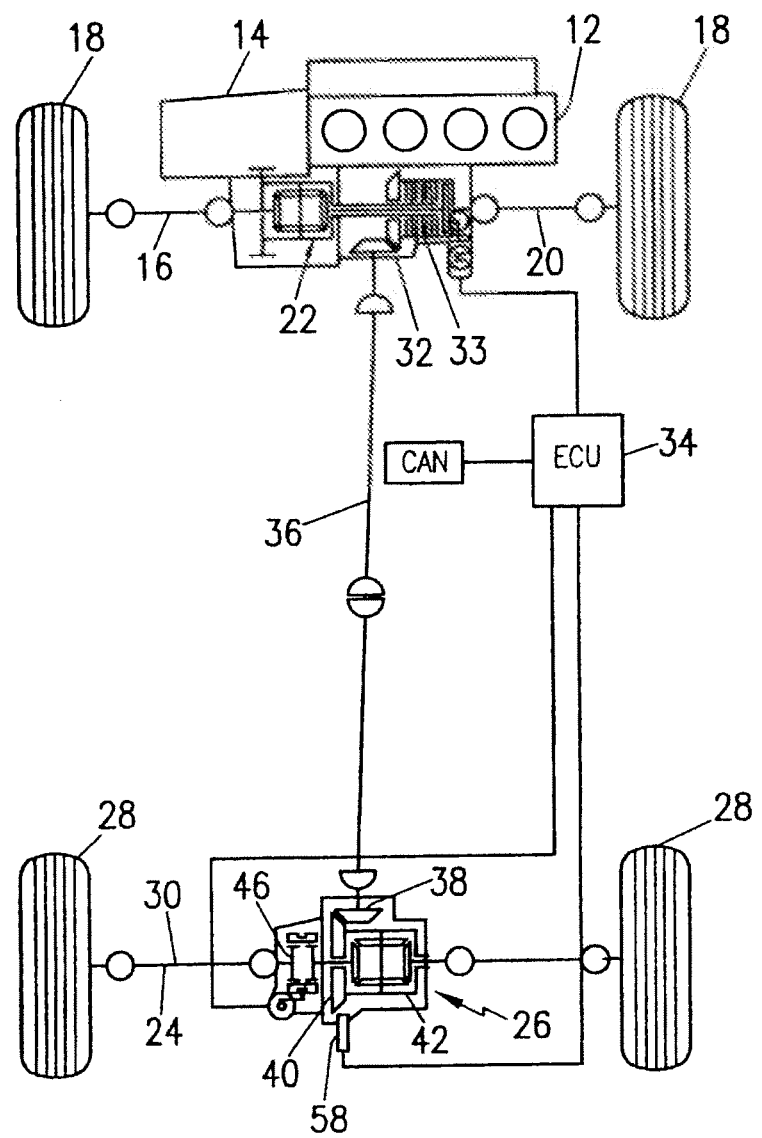
FIG. 1 is a schematic representation of a powertrain in accordance with the invention in accordance with a first embodiment.

In FIG. 1, the powertrain of a motor vehicle is shown in whose front region a drive unit 12 is arranged, in the present example a combustion engine disposed transversely to the longitudinal axis of the motor vehicle. The drive unit 12 is permanently connected via a variable speed gearbox 14 to a front axle 16 of the motor vehicle including a front axle differential 22 so that front wheels 18 seated on the front axle 16 are permanently driven by the drive unit 12 during the drive. The front axle 16 is therefore also called the primary axle 20.

In a rear vehicle region, the motor vehicle has a rear axle 24 having a rear axle differential 26 and rear wheels 28. The rear axle 24 forms a secondary drive axle, also called a secondary axle 30, since it can be driven on demand by the drive unit 12.

For this purpose, a controllable torque diversion device 32 is arranged at the primary axle 20 and an adjustable portion of the drive torque provided by the drive unit 12 can be diverted by it to the secondary axle 30. The torque diversion device 32 includes a multi-disk clutch 33 which is controlled by a control unit 34.

The input of the multi-disk clutch 33 is permanently driven by the driven unit 12 and is shown connected to a differential case of the front axle differential 22. The output of the multi-disk clutch 33 is connected to the one end of a torque transfer section 36, e.g. of a Cardan shaft. At its other end, the torque transfer section 36 is connected to a bevel gear 38 which is in engagement with a crown wheel 40 which is connected to a differential cage 42 of the rear axle differential 26 (FIG. 2).

To prevent the torque transfer section 36 and the differential cage 42 of the rear axle differential 26 from turning unnecessarily and consuming energy during the drive and with an opened multi-disk clutch 33, i.e. on purely front-wheel drive, a device is provided to deactuate the torque transfer section 36 and the differential cage 42.

Figure 2:
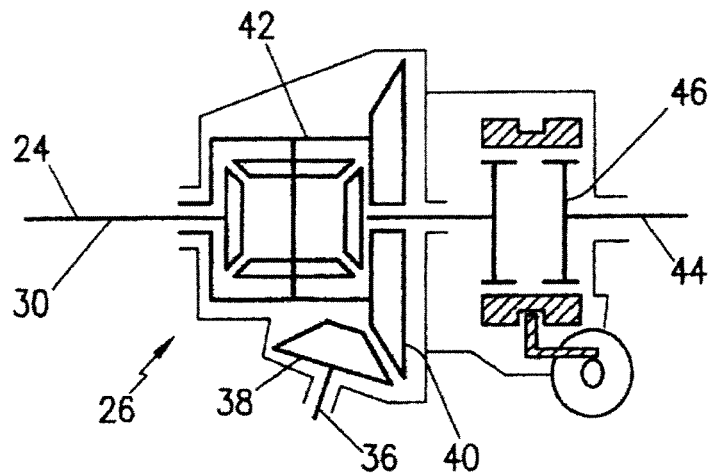
FIG. 2 is a schematic representation of an axle differential with a secondarily connected dog clutch of a secondary axle of the powertrain of FIG. 1.

In the embodiment shown in FIGS. 1 and 2, the deactuation device is formed by a dog clutch 46 which is arranged at a split axle 44 of the rear axle 24 in the proximity of the rear axle differential 26 and which is likewise controllable by the control unit 34. Alternatively, the dog clutch 46 can also be controlled by a separate control unit which is separate from the control unit 34 controlling the multi-disk clutch 33 and which is connected to the control unit 34 via e.g. a CAN bus.

Figure 3:
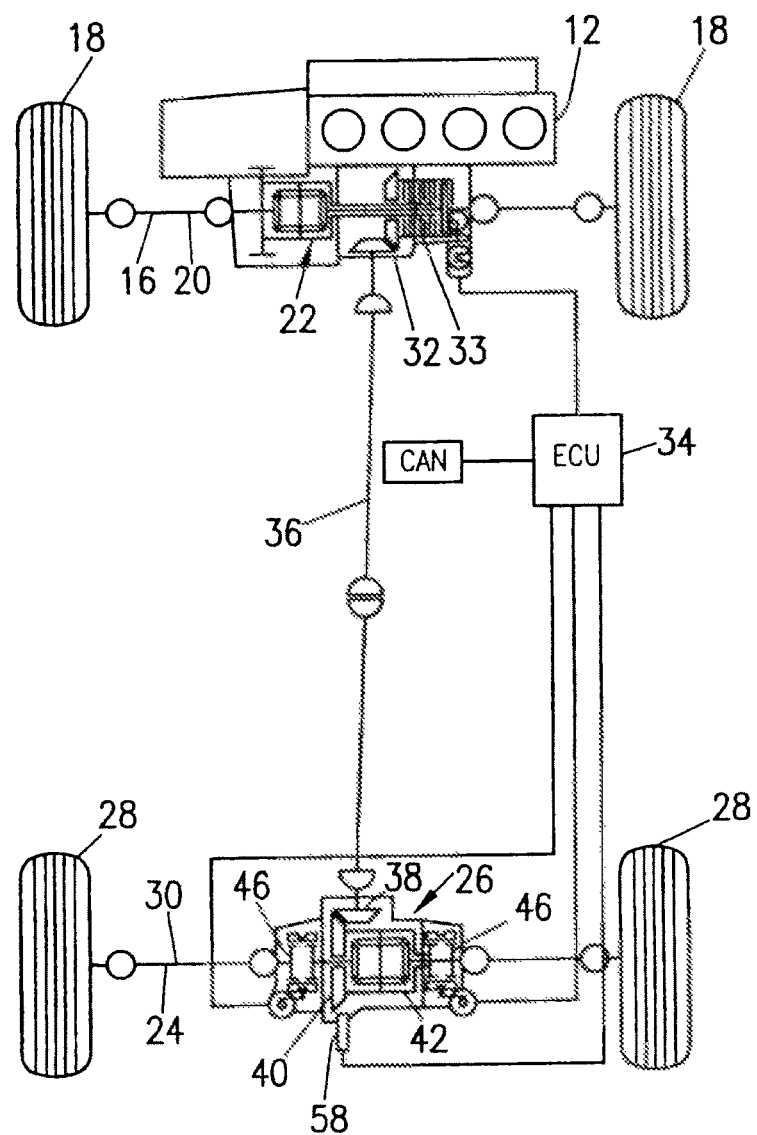
FIG. 3 is a schematic representation of a second embodiment of a powertrain in accordance with the invention.

In FIG. 3, an alternative embodiment of a deactuation device is shown which includes two dog clutches 46 which can be controlled by the control unit 34 and which are arranged at split axles in the rear axle 24 or which can be arranged in the hubs of the rear wheels 28.

Figure 4:
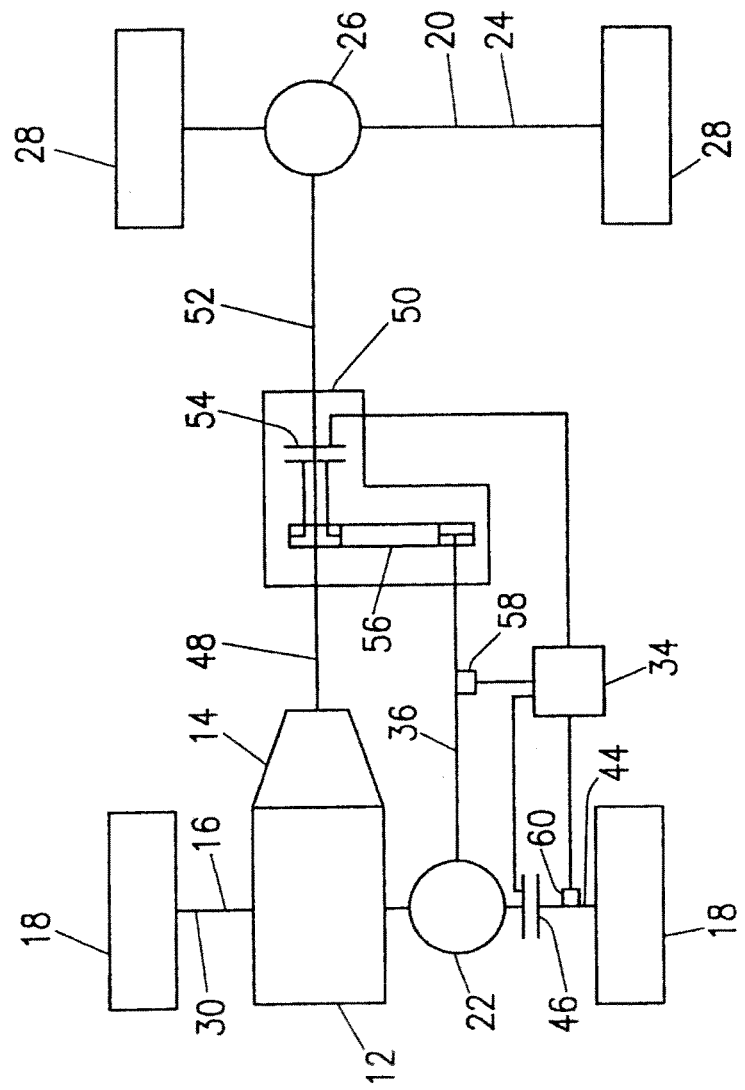
FIG. 4 is a schematic representation of a third embodiment of a powertrain in accordance with the invention.

In FIG. 4, a third embodiment of a powertrain in accordance with the invention is shown. The powertrain includes a drive unit 12, e.g. a combustion engine, arranged in a front region of the motor vehicle. Unlike the embodiments described above, the drive unit 12 of the third embodiment is, however, not aligned transversely to the longitudinal axis of the motor vehicle, but parallel thereto.

The drive unit 12 is connected via a variable speed gearbox 14 to the input shaft 48 of a transfer case 50. A primary output shaft 52 of the transfer case 50 rigidly connected to the input shaft 48 is permanently connected to the rear axle 24 of the motor vehicle via a rear axle differential 26. Unlike in the embodiments described above, in the third embodiment, the rear wheels 28 seated on the rear axle 24 are therefore permanently driven, so that in this case the rear axle 24 is called a primary axle 20.

The transfer case 50 includes in a manner known per se a multi-disk clutch 54 whose input is rotationally fixedly connected to the input shaft 48 of the transfer case 50 and whose output is connected via a chain drive 56 or via gears meshing with one another to the one end of a torque transfer section 36 leading to the front axle differential 22 of the front axle 16. At the other end of the torque transfer section 36—in a similar manner as shown in FIG. 2—a bevel gear is provided which is in engagement with a crown wheel which is fixedly connected to the differential cage of the front axle differential 22.

The multi-disk clutch 54 of the transfer case 50 is connected to a control unit 34. On demand, a portion of the drive torque provided by the drive unit 12 can be transferred by a corresponding control of the multi-disk clutch 54 via the torque transfer section 36 and the front axle 16 to the front wheels 18. In this case, the front axle 16 therefore represents the secondary axle 30.

To prevent that the torque transfer section 36 and the chain drive 56 or the gear drive of the transfer case 50 are driven and move unnecessarily during the drive by the front wheels 18 with an opened multi-disk clutch 54, i.e. with a purely rear wheel drive, a deactuation device for the deactuation of the torque transfer section 36 is also provided in the third embodiment shown in FIG. 4.

The deactuation device shown in FIG. 4 is made in a similar manner to the deactuation device shown in FIG. 1 and includes a dog clutch 46 which is controllable by the control unit 34 or by a control unit separate from the control unit 34 and connected to it e.g. via a CAN bus and which is arranged in a split axle 44 of the front axle 16 in the region of the front axle differential 22.

An alternative deactuation device can also be conceived in the third embodiment shown in FIG. 4, with the alternative deactuation device being able to be formed in a similar manner to the embodiment shown in FIG. 3 by a pair of dog clutches accommodated in a pair of split axles or in the hubs of the front wheels 18 and controllable by the control unit 34 or by a separate control unit.

The operation of the three powertrains described above takes place in a mode in which, in addition to a permanent drive of the primary axle 20, on demand, i.e. for example under predetermined driving conditions such as wheel slip at the wheels of the primary axle 20, drive torque of the drive unit 12 is automatically conducted to the secondary axle 30 and is transferred to the wheels of the secondary axle 30 under the control of the control unit 34. In this respect, the drive torque portion transferred to the secondary axle 30 can be set variably via a corresponding engagement of the multi-disk clutch 33 included in the torque diversion device 32 or of the multi-disk clutch 54 of the transfer case 50 and can thus be matched to the driving conditions. Due to the automatic engagement on demand of the secondary axle 30, this drive mode is here called the automatic four-wheel drive mode.

In addition to the automatic four-wheel drive mode, the vehicle can additionally have a permanent two-wheel drive mode in which only the primary axle 20 is driven and/or a permanent four-wheel drive mode in which both the primary axle 20 and the secondary axle 30 are permanently driven, with, in the permanent four-wheel operating mode, either a fixedly preset transfer of the drive torque to the primary axle 20 and to the secondary axle 30 being conceivable or a transfer adapted in a variably adjustable manner to the driving conditions.

A requirement for drive torque to be able to be transferred as immediately as possible to the secondary axle 30 on demand in the automatic four-wheel drive mode is that the or each dog clutch 46 is closed as fast as possible. In particular from the deactuated state of the torque transfer section 36, this requires a synchronization of the movement of the torque transfer section 36 with the movement of the secondary axle 30. The duration of the synchronization in this respect depends on the difference of the speeds of the secondary axle 30 and of the torque transfer section 36, i.e. ultimately, with a completely deactuated torque transfer section 36, on the vehicle speed.

To achieve an engagement of the secondary axle 30 as fast as possible, in accordance with the invention a monitoring of the wheels of the primary axle 20 for wheel slip is provided. For this purpose, the control unit 34 is connected to corresponding wheel slip detectors. The wheel slip detectors can, for example, be speed of rotation sensors, not shown, which monitor the speeds of the wheels of the primary axle 20 and of the secondary axle 30.

As soon as the averaged speed of the wheels of the primary axle 20 (line A in FIG. 5) exceeds the averaged speed of the wheels of the secondary axle 30 (line B in FIG. 5) by a predetermined amount (optionally dependent on the steering angle), the control unit 34 assumes that there is wheel slip at the primary axle 20 and that there is a demand for four-wheel drive.

The control unit 34 therefore instigates the engagement of the secondary axle 30 at a time t=0 in that it first commands the synchronization of the torque transfer section 36 with the secondary axle 30.

The synchronization takes place with the help of the multi-disk clutch 54 of the transfer case 50 or with the help of the multi-disk clutch 33 of the torque diversion device 32 which is engaged in a controlled manner for this purpose. The multi-disk clutch 33, 54 requires approximately 70 milliseconds to 80 milliseconds to run through the release clearance before it starts actually to accelerate the torque transfer section 36 (curve C in FIG. 5).

The acceleration of the torque transfer section 36 can take place in accordance with a fixedly preset speed gradient or in accordance with a speed gradient which is matched to the driving conditions and e.g. can be taken correspondingly from a look-up table.

As FIGS. 1, 3 and 4 show, the control unit 34 is connected to a speed of rotation sensor 58 for the monitoring of the speed of the torque transfer section 36. The speed of rotation sensor 58 allows the control unit 34 to determine the actual acceleration of the torque transfer section 36 and to compare it with a desired acceleration or with a desired speed gradient. Alternatively, the signal of the speed of rotation sensor 58 can be used as an actual value for a speed regulation, i.e. the multi-disk clutch 33, 54 is actuated by means of a speed controller such that the named actual value of the speed is approximated to a desired value.

The control unit 34 can have a learning routine which allows it to adapt an originally preset synchronization torque and thereby to compensate tolerances and temperature effects as well as changes over the service life which can impair the accuracy of the multi-disk clutch.

Furthermore, the learning routine can be used to calibrate and/or check the system with a disengaged dog clutch 46. The low torque range and the accuracy of the multi-disk clutch in the low torque range can in particular be verified and/or checked and/or other diagnostics can be carried out. For example, the look-up table in which the transferred torque over the state of engagement of the multi-disk clutch is stored can be adapted correspondingly when the acceleration of the torque transfer section 36 is faster or slower than expected.

After approximately 230 milliseconds, the movement of the torque transfer section 36 is synchronized with the movement of the secondary axle 30, i.e. the speed of the torque transfer section 36 approximately corresponds to the speed of the secondary axle 30 so that the or each dog clutch 46 can be engaged. A speed of rotation sensor (not shown) connected to the control unit 34 is provided to determine the speed of the secondary axle 30.

Figure 5:
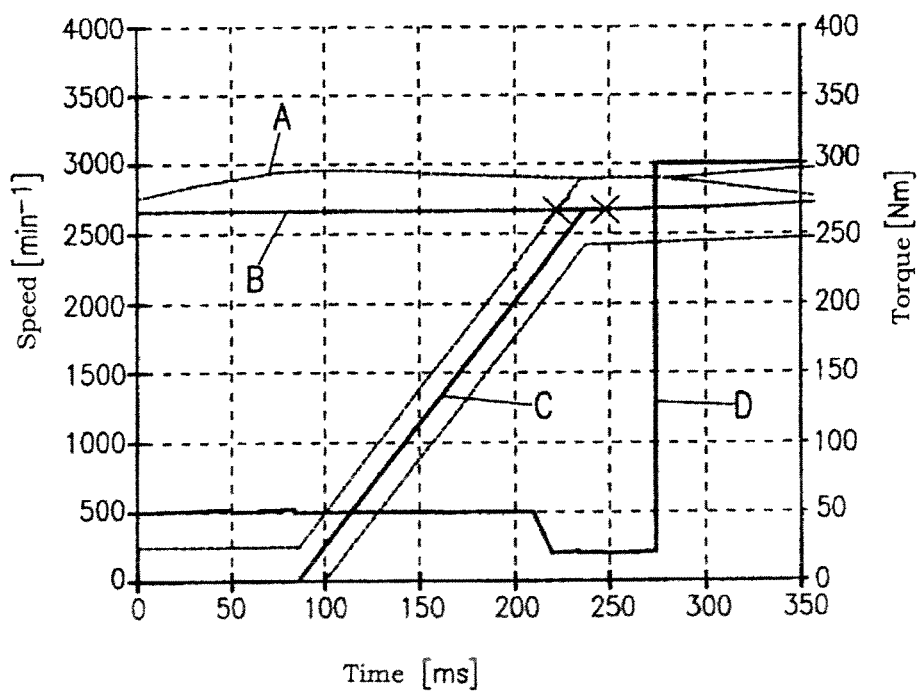
FIG. 5 is a graphic in which the speeds of a primary axle, of a secondary axle, of a torque transfer section leading from the primary axle to the secondary axle, and the drive torque transferred to the secondary axle during the engagement of the secondary axle from a deactuated state of the torque transfer section in one of the powertrains from FIGS. 1, 3, 4 are shown.

Usually, the closing of the dog clutch(es) 46 does not require any exact coincidence of the speeds of the torque transfer section 36 and of the secondary axle 30, but rather the engagement can take place within a speed difference range which corresponds to a time period marked by the crosses "X" in FIG. 5.

While taking account of the fact that the engagement of the dog clutch 46 takes place with a certain delay, the closing of the dog clutch 46 can already be commanded at a time which is before the time at which the speed of the torque transfer section 36 achieves the speed of the secondary axle 30. The exact time for the activation of the dog clutch 46 can easily be determined from the acceleration of the torque transfer section 36, i.e. from the preset desired speed gradient or from the actual speed gradient such as is determined by the monitoring of the speed of the torque transfer section 36 with the help of the speed of rotation sensor 58.

In addition, a blocking synchronization apparatus can be provided which prevents a closing of the dog clutch 46 as long as the difference between the speed of the secondary axle 30 and the speed of the torque transfer section 36 is too high. As soon as the speed difference reaches a permitted range, the blocking synchronization apparatus allows an automatic engagement of the dog clutch 46.

To facilitate the closing of the dog clutch 46 and in particular the actuation of a selector sleeve associated with it, the torque provided by the multi-disk clutch 33, 54 (curve D in FIG. 5) during the engagement of the dog clutch 46 is briefly reduced and raised, after the closing of the dog clutch 46, to the value which should ultimately be transferred to the secondary axle 30.

It is possible by the use of the multi-disk clutch 54 for the synchronization of the torque transfer section 36 to synchronize the torque transfer section 36 with the secondary axle 30 within a very short time.

As a result, the measures described above allow an engagement of the secondary axle 30 from a deactuated state of the torque transfer section 36 within a very short time, for example within 200 milliseconds up to 300 milliseconds.

Since the torque for the acceleration of the torque transfer section 36 is diverted from the drive unit 12 and thus from the primary axle 20, the synchronization of the torque transfer section 36 moreover, additionally to a traction control, contributes to reducing the wheel slip at the primary axle 20, whereby the wheel slip at the primary axle 20 can be kept at a low value.

After the engagement of the secondary axle 30 has taken place, the powertrain is operated in four-wheel drive mode by the control unit 34, with a check being made at regular time intervals whether the four-wheel drive mode is still necessary. If this is no longer the case, a switch back to the two-wheel drive is made in that the dog clutch 46 and the multi-disk clutch 33 or 54 respectively are opened again.

In FIGS. 6 to 9, further embodiments of a power train in accordance with the invention are shown in which the torque transfer section 36 can in each case be deactuated or engaged in the manner described above.

Figure 6:
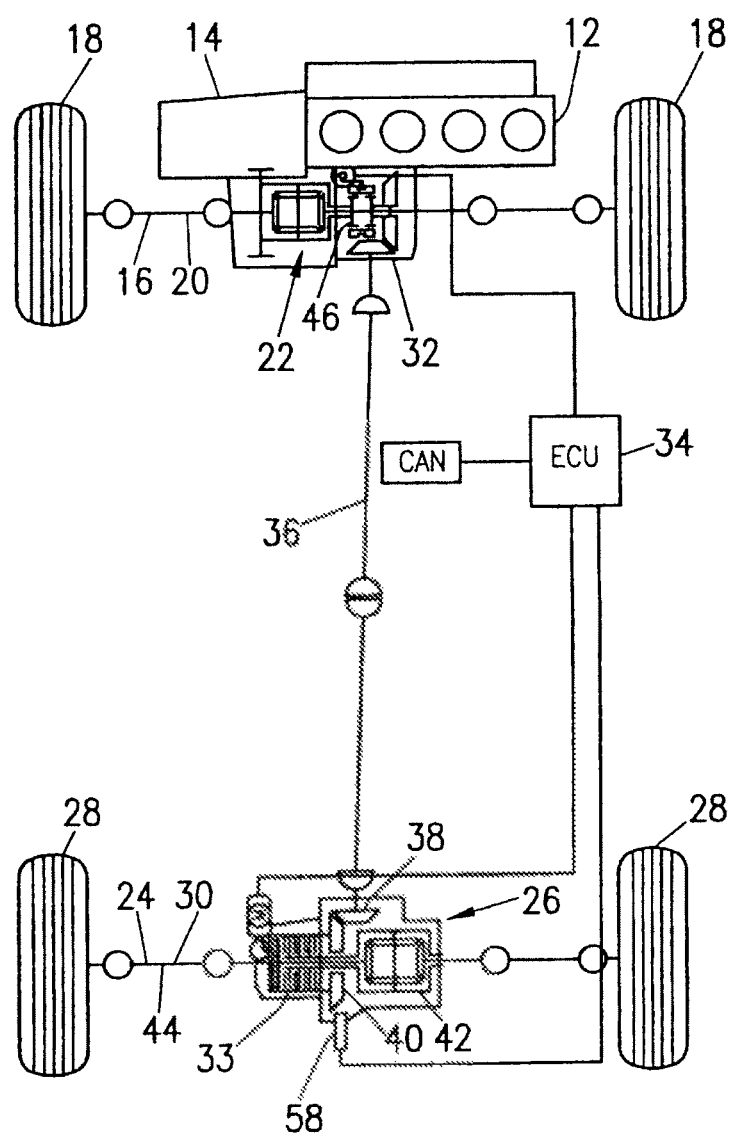
FIG. 6 is a schematic representation of a fourth embodiment of a powertrain in accordance with the invention.

FIG. 6 shows a fourth embodiment which differs from the embodiment shown in FIG. 1 in that the dog clutch 46 is arranged at the primary axle 20, and indeed between the front axle differential 22 and the torque diversion device 32, whereas the multi-disk clutch 33 is located at the secondary axle 30, i.e. that is the rear axle 24. More precisely, the multi-disk clutch 33 is connected between the crown wheel 40 in engagement with the bevel gear 38 of the torque transfer section 36 and the differential cage 42 of the rear axle differential 26. In this embodiment, the engagement of the dog clutch 46 requires a synchronization of the movement of the torque transfer section 36 with the movement of the primary axle 20 which can be achieved, for example, by an at least partial closing of the multi-disk clutch 33 at the secondary axle 30.

Figure 7:
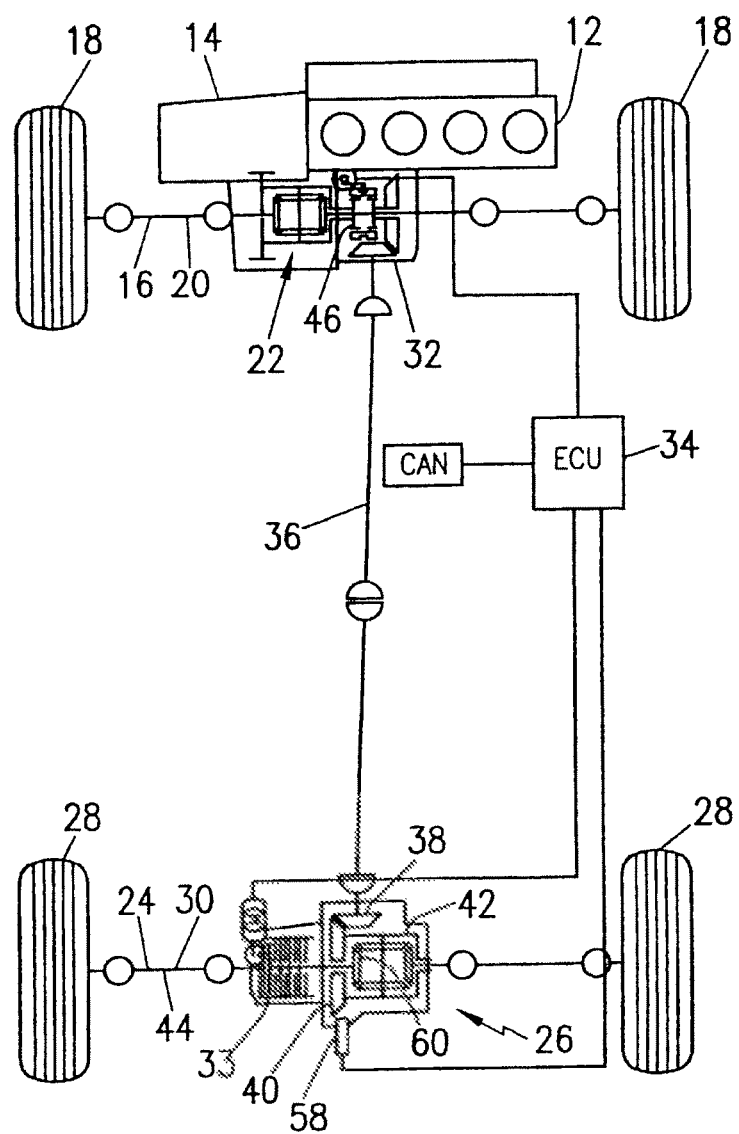
FIG. 7 is a schematic representation of a fifth embodiment of a powertrain in accordance with the invention.

FIG. 7 shows a fifth embodiment which only differs from the fourth embodiment shown in FIG. 6 in that the multi-disk clutch 33 arranged at the rear axle 24 or secondary axle 30 is connected between a side gear 60 of the rear axle differential 26 and a split axle 44 of the rear axle 24.

Figure 8:
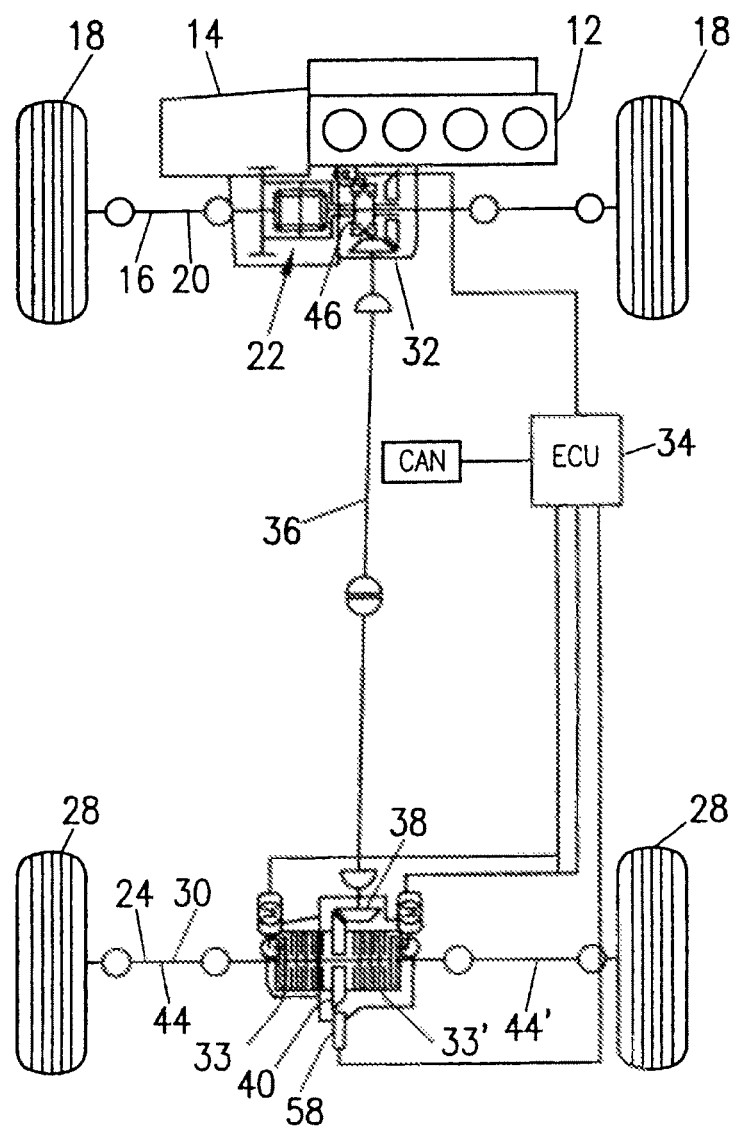
FIG. 8 is a schematic representation of a sixth embodiment of a powertrain in accordance with the invention.

FIG. 8 shows a sixth embodiment which differs from the fourth embodiment shown in FIG. 6 in that no rear axle differential 26 is provided, but rather, in addition to the multi-disk clutch 33 connected between the crown wheel 40 and the one split axle of 44 of the rear axle 24, a further multi-disk clutch 33' is connected between the crown wheel 40 and the other split axle 44'. The rear axle differential 26 is therefore replaced in this embodiment by the combination of the two multi-disk clutches 33, 33', with each of the multi-disk clutches 33, 33' being separately controllable by the control unit 34.

Furthermore, a seventh embodiment is shown in FIG. 9 which only differs from the fifth embodiment shown in FIG. 7 in that the dog clutch 46 is provided with an integrated synchronization device. In this case, the synchronization of the movement of the torque transfer section 36 with the movement of the primary axle 20 can therefore also take place alternatively or additionally to the multi-disk clutch 33 by the synchronization device of the dog clutch 46.

Figure 10A:
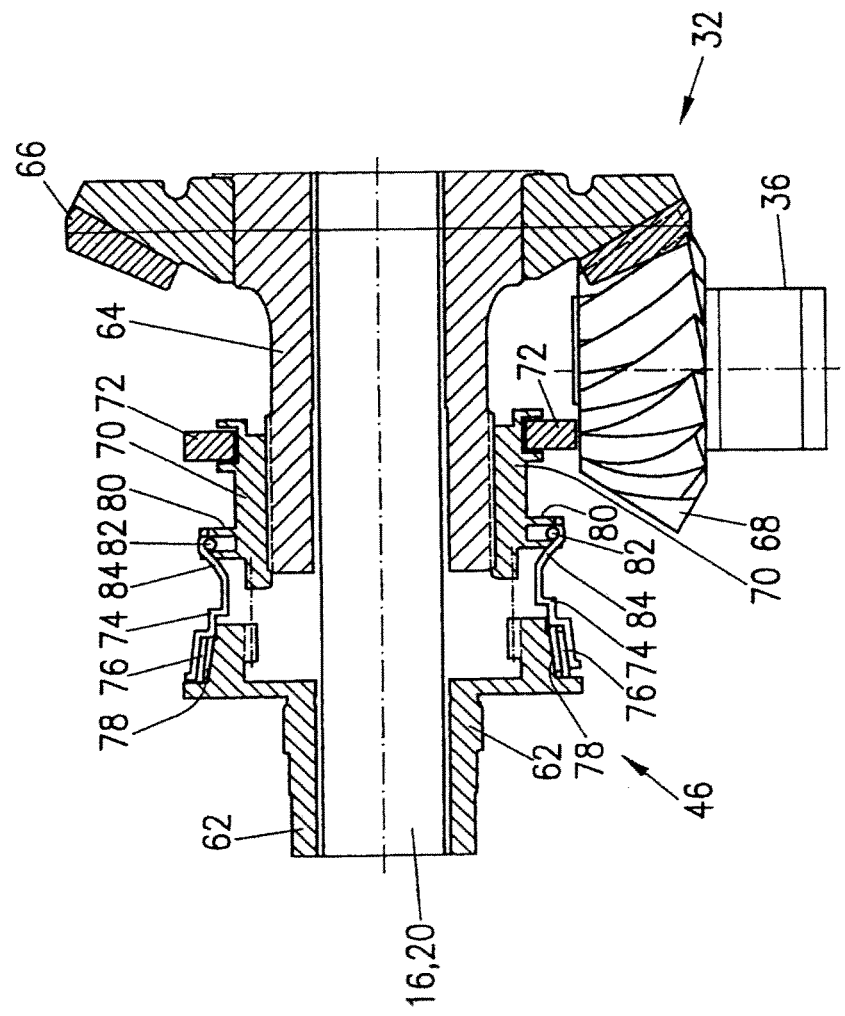

A detailed view of the dog clutch 46 integrated into the torque diversion device 32 of the powertrain in accordance with the seventh embodiment is shown in FIG. 10. The dog clutch 46 includes a first clutch part 62 which is rotationally fixedly connected to the differential cage of the front axle differential 22 and is rotatably journaled with respect to a shown split axle of the front axle 16. A second clutch part 64 of the dog clutch 46 likewise rotatably journaled with respect to the shown split axle of the front axle 16 is rotationally fixedly connected to a crown wheel 66 which is in engagement with a bevel gear 68 of the torque transfer section 36.

The engagement of the dog clutch 46 takes place by means of a clutch ring 70 supported rotationally fixedly and axially displaceably on the second clutch part 64. The clutch ring 70 is axially movable between a first position in which the clutch ring 70 is only in engagement with the second clutch part 64 (FIG. 10A) and a second position in which the clutch ring 70 is in engagement both with the second clutch part 64 and with the first clutch part 62 (FIG. 10O) to transfer torque from the first clutch part 62 to the second clutch part 64.

For the axial displacement of the clutch ring 70, a shift fork 72 is provided which is movable by a motor which is controlled by the control unit 34.

With a deactuated torque transfer section 36, the second clutch part 64 and thus the clutch ring 70 are also stationary.

So that the clutch ring 70 can be brought into engagement with the first clutch part 62, a certain speed similarity is required between the clutch ring 70 or the second clutch part 64 and the first clutch part 62. A synchronization apparatus which becomes active as soon as the clutch ring 70 is moved in the direction of the first clutch part 62 is integrated into the clutch 46 for the synchronization of the speed of the clutch ring 70 with the speed of the first clutch part 62.

The synchronization apparatus includes a plurality of synchronization hoops 74 which are arranged around the axle 16 and 20 respectively and which each project over a section of the first clutch part 62 and of the clutch ring 70. The synchronization hoops 74 are rotationally fixedly connected to the clutch ring 70 and consequently rotate at the same speed as the second clutch part 64.

Each synchronization hoop 74 is provided in the region of its end facing the first clutch part 62 with a friction surface 76 at its inner side. Correspondingly, a friction surface 78 is formed at the outside of the section of the first clutch part 62 projected over by the synchronization hoops 74.

The clutch ring 70 has at its outside a guide 80 in which a spring ring 82 is supported and is secured against a displacement in the axial direction. The spring ring 82 presses from the inside against the synchronization hoops 74, i.e. it exerts a force against the synchronization hoops 74 outwardly in the radial direction.

The section 84 of each synchronization hoop 74 projecting over the clutch ring 70 is made in ramp-like manner such that the spring ring 82 is compressed radially inwardly against its restoring force when the clutch ring 70 is moved to the first clutch part 62 to engage the clutch 46.

The force exerted onto the synchronization hoops 74 by the spring ring 82 has the effect that the friction surfaces 76 of the synchronization hoops 74 are pressed toward the friction surfaces 78 of the first clutch part. In this respect, the force with which the friction surfaces 76, 78 are pressed toward one another is the greater the further the spring ring 82 is compressed.

In the disengaged state of the clutch 46 (FIG. 10A), the force exerted by the spring ring 82 onto the synchronization hoops 74 is so small that the friction surfaces are just not in contact, whereas the friction surfaces 76, 78 are, shortly before the clutch ring 70 comes into engagement with the first clutch part 62 (FIG. 10B), compressed toward one another with a force which is sufficient to accelerate the second clutch part 64 to the speed of the first clutch part 62 at a desired acceleration.

As can be seen from FIG. 10, the synchronization apparatus of the clutch 46 is formed without a blocking element. This allows the clutch 46 also to be engaged when no speed identity is established between the first and second clutch parts 62, 64, i.e. even if there is still a certain speed difference between the clutch parts 62, 64.

The engagement of the secondary axle 30 of the powertrain of FIG. 9 will now be explained with reference to FIG. 11 starting from a deactuated torque transfer section 36.

As soon as the averaged speed of the wheels of the primary axle 20 (line A in FIG. 11) exceeds the averaged speed of the wheels of the secondary axle 30 (line B in FIG. 11) by a predetermined amount (optionally dependent on the steering angle), the control unit 34 assumes that there is wheel slip at the primary axle 20 and that there is a demand for four-wheel drive.

The control unit 34 therefore instigates the engagement of the secondary axle 30 at a time t=0 in that it first commands the synchronization of the torque transfer section 36 with the secondary axle 30.

The synchronization takes place with the help of the dog clutch 46 of the torque diversion device 32 in that the clutch ring 70 is displaced in the direction of the first clutch part 62 to press the friction surfaces 76, 78 toward one another in a controlled manner. After approximately 30 ms, a preset synchronization torque is transferred from the first clutch part 62 via the synchronization hoops 74 to the second clutch part 64 (curve E in FIG. 11), whereby the speed of the torque transfer section 36 is increased (curve C in FIG. 11). The preset synchronization torque amounts in the present embodiment to 100 Nm and is maintained for so long until the speed of the torque transfer section 36 has at least approximately reached the speed of the primary axle 20.

As soon as the speed difference between the primary axle 20 and the torque transfer section 36 falls below a preset limit which allows a closing of the dog clutch 46 which is essentially not noticeable for a vehicle occupant, the second clutch part 64 is brought into engagement with the first clutch part 62 by a still further displacement of the clutch ring 70, i.e. the dog clutch 46 is completely engaged. In the present embodiment, this takes place approximately 210 ms after the detection of the wheel slip.

Even before the torque transfer section 36 (curve C in FIG. 11) has reached the speed of the primary axle 20 (curve A in FIG. 11), which is the case at approximately 210 ms in accordance with FIG. 11), it is started to engage the multi-disk clutch 33 (curve D in FIG. 11), at approximately 190 ms in the present embodiment. As long as the speed of the secondary axle (curve B in FIG. 11) is higher than the speed of the torque transfer section 36, the engagement of the multi-disk clutch 33 does not effect any braking of the torque transfer section 36. That is, for the preparation of a fast engagement of the multi-disk clutch 33, the release clearance can already be overcome so that the disks of the multi-disk clutch 33 are in minimal contact with one another (so-called "kiss point").

If the torque transfer section 36 reaches the speed of the secondary axle 30, the multi-disk clutch 33 can admittedly counter the further acceleration or synchronization of the torque transfer section 36 by the control of the kiss point. This is, however, accepted in order to achieve a faster engagement of the secondary axle 30 overall. Since the synchronization apparatus of the dog clutch 46—as already mentioned—is made without a blocking device, the dog clutch 46 can namely be connected, i.e. that is closed, despite the speed dissimilarity.

As a result, a fast engagement of the secondary axle 30 is achieved in this manner in approximately 250 ms after the detection of a wheel slip at the primary axle 20, with the drive torque transferred to the secondary axle 30 developing in accordance with the curve F in FIG. 11 during this time.

In FIG. 12, an eighth embodiment is shown which differs from the seventh embodiment shown in FIG. 9 in that the multi-disk clutch 33 arranged at the rear axle 24 or secondary axle 30 is not connected between a side gear 60 of the rear axle differential 26 and a split axle 44 of the rear axle, but rather between the torque transfer section 36 and the bevel gear 38 of the rear axle differential 26.

In the embodiment shown, the multi-disk clutch 33 is a motor-actuated clutch which is controlled by the control unit 34. Alternatively, the multi-disk clutch 33 can, however, also be a clutch which works in a speed dependent manner and which closes, in particular automatically, as soon as the difference of the speed at the clutch input and output exceeds a preset amount or opens as soon as the speed difference falls below a predetermined amount.

In addition, a dog clutch 86 controllable by the control unit 34 is connected between a side gear 60 of the rear axial differential 26 and a split axle 44 of the rear axle 24. The dog clutch 86 can be a simple dog clutch which in particular does not have any synchronization device.

If both the dog clutch 46 located in the torque diversion device 32 and the dog clutch 86 arranged at the rear axle 24 are opened, not only the torque transfer device 36, but also the multi-disk clutch 33 and the differential cage 42 of the rear axle differential 26 are deactuated.

If, starting from this deactuated state, the secondary axle 30 or rear axle 24 are engaged, the torque transfer device 36 is accelerated, as described with reference to FIGS. 10 and 11, with the help of the dog clutch 46 of the torque diversion device 32 so much until the clutch parts of the dog clutch 46 of the torque diversion device 32 have a speed similarity such that the dog clutch 46 of the torque diversion device 32 can be completely closed.

The speed at the input of the multi-disk clutch 33 also increases by the acceleration of the torque transfer device 36. Due to drag torques in the multi-disk clutch 33 and/or because the multi-disk clutch 33 closes automatically due to the difference of the speeds at the clutch input and output or because the multi-disk clutch 33 is engaged by the control unit 34, the speed at the output of the multi-disk clutch 33 increases, whereby the differential cage 42 of the rear axle differential 26 connected to the multi-disk clutch 33 via the bevel gear 38 and the crown wheel 40 also rotates.

The rotation of the differential cage 42 has the result that the clutch part of the dog clutch 86 connected to the side gear 60 of the rear axle differential 26 is brought at least approximately to the speed of the clutch part connected to the split axle 44 of the rear axle 24 so that the dog clutch 86—controlled by the control unit 34—can be closed with an at most minimal jolt.

To determine a speed similarity sufficient for the engagement of the dog clutch 86 located at the rear axle 24, the control unit 34 is connected to a speed of rotation sensor 58 which monitors the speed of the crown wheel 40 and thus of the differential cage 42 and to sensors, not shown, for the detection of the speeds of the rear wheels 28.

REFERENCE NUMERAL LIST 12 drive unit
14 variable speed gearbox
16 front axle
18 front wheels
20 primary axle 22 front axle differential
24 rear axle
26 rear axle differential
28 rear wheels
30 secondary axle
32 torque diversion device
33 multi-disk clutch
34 control unit
36 torque transfer section
38 bevel gear
40 crown gear
42 differential cage
44 split axle
46 dog clutch
48 input shaft
50 transfer case
52 primary output shaft
54 multi-disk clutch
56 chain drive
58 speed of rotation sensor
60 side gear
62 clutch part
64 clutch part
66 crown gear
68 bevel gear
70 clutch ring
72 shift fork
74 synchronization hoop
76 friction surface
78 friction surface
80 guide
82 spring ring
84 section
86 dog clutch The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A powertrain for a motor vehicle having a primary axle and a secondary axle, the powertrain comprising:
   a drive unit operable for generating drive torque;
   the primary axle having a primary axle differential driven by the drive unit for transmitting the drive torque to a pair of primary wheels;
   a torque diversion device arranged at the primary axle and having a first clutch driven by the drive unit and operable to engage a torque transfer device to transfer a portion of the drive torque generated by the drive unit to the torque transfer device when the first clutch is actuated;
   the secondary axle connectable to a secondary axle differential, the secondary axle differential being interconnected to the torque transfer device for transmitting the portion of the drive torque to the secondary axle and a pair of second wheels when the secondary axle differential is connected to the secondary axle and the first clutch is actuated;
   a second clutch arranged at the secondary axle for connecting the secondary axle to the secondary axle differential when the second clutch is closed, the second clutch disconnecting the secondary axle from the secondary axle differential when the second clutch is open, the second clutch being open when the first clutch is released from the torque transfer device, the torque transfer device being positioned between the first and second clutches; and
   a control unit for automatic control of the first clutch and the second clutch and being connected to at least one sensor capable of detecting wheel slip at the primary wheels, the control unit is operable to actuate the first clutch based on a detected wheel slip at the primary wheels and closes the second clutch to establish a drive connection between the drive unit, the first clutch, the torque transfer device, the secondary axle differential, the second clutch, and the secondary axle to transfer the portion of the drive torque from the drive unit to the secondary axle.

2. The powertrain of claim 1, wherein the control unit is further operable to variably engage the first clutch and the torque transfer device following closure of the second clutch to establish an automatic four-wheel drive mode.

3. The powertrain of claim 2, wherein the first clutch is actuated prior to closure of the second clutch, and the torque transfer device is accelerated by the portion of the drive torque transferred from the drive unit to the torque transfer device by the first clutch prior to closure of the second clutch.

4. The powertrain of claim 3, wherein the first clutch is controllably actuated by the control unit to accelerate the rotary speed of the torque transfer device relative to the secondary axle.

5. The powertrain of claim 3, wherein the torque transfer device is accelerated such that a longitudinal acceleration of the vehicle resulting from the acceleration of the torque transfer device does not exceed a predetermined acceleration limit value.

6. The powertrain of claim 3, wherein the torque transfer device is accelerated in accordance with a predetermined speed gradient and/or a speed gradient taken from a look-up table.

7. The powertrain of claim 1, wherein a speed of rotation sensor operable for detection of the speed of the torque transfer device is connected to the control unit.

8. The powertrain of claim 7, wherein the control unit closes the second clutch in dependence on the speed of the torque transfer device detected by the speed of rotation sensor.

9. The powertrain of claim 1, wherein a speed of rotation sensor for detection of the speed of the secondary axle is connected to the control unit.

10. The powertrain of claim 1, wherein the speed of the torque transfer device does not exceed the speed of the secondary axle.

11. The powertrain of claim 1, wherein the second clutch is closed only when the difference between the speed of the torque transfer device and the speed of the secondary axle is in a predetermined range.

12. The powertrain of claim 1, wherein the control unit is operable to reduce the drive torque generated by the drive unit when the second clutch is closed.

13. The powertrain of claim 1, wherein the torque transfer device is accelerated at least approximately to the speed of the secondary axle or primary axle by the portion of the drive torque transferred from the drive unit to the torque transfer device by the first clutch prior to closure of the second clutch.

14. The powertrain of claim 13, wherein the torque transfer device is accelerated such that a longitudinal acceleration of the vehicle resulting from the acceleration of the torque transfer device does not exceed a predetermined acceleration limit value.

15. The powertrain of claim 13, wherein the torque transfer device is accelerated in accordance with a predetermined speed gradient and/or a speed gradient from a look-up table.

16. The powertrain of claim 1, wherein the torque transfer device is accelerated by movement of the secondary axle after closure of the second clutch.

17. The powertrain of claim 1, wherein the control unit is operable to initially close the second clutch in dependence on a detected wheel slip at the primary axle and then close the first clutch.

18. The powertrain of claim 1, wherein the first clutch is a multi-disk clutch and the second clutch is a dog clutch.

* * * * *